COATING OR PLASTIC.

Patented Aug. 13, 1940

2,211,368

UNITED STATES PATENT OFFICE 2,211,368

RETARDER COMPOSITION FOR CEMENT MIXTURES

Charles H. Dickens, Waco, Tex.

No Drawing. Application August 18, 1939, Serial No. 290,925

4 Claims. (Cl. 106—28)

This invention relates to cement and more particularly to a retarder composition for addition to cement whereby the setting time of the cement is rendered substantially uniform in the temperature range 140°–180° F.

In cementing deep oil wells where high temperatures are encountered it is desirable to have a cement which, with certain percentages of water, will set at some predetermined time appreciably longer than the setting time of regular Portland cement at the temperature of 140° F. and higher. This longer setting or stiffening time permits cement slurry to be pumped properly in place and in the amount that may be necessary. It has been found that the temperatures of deep oil wells range from temperatures of 140° F. to 180° F. or higher and a cement is desirable that will work anywhere within this range. Usually such cement is of the type of Portland cement known in the art as sulfate-resisting cement.

One of the objects of the present invention is to provide a cement mixture suitable for use in cementing oil wells, which is characterized by having a predetermined and desired setting time within the temperature range 140°–180° F. Another object is to provide an improved cement composition for use in cementing deep oil wells. Still another object is to provide a retarder composition effective in retarding the setting time of cement for substantially uniform time intervals over the temperature range 140°–180° F. Other objects and advantages will be apparent as the invention is more fully hereinafter disclosed.

In accordance with these objects I have discovered a combination of chemicals that causes the proper reaction in oil well cement to produce a slurry when using 40% water that will give equal or approximately the same stiffening times at temperatures within the range 140° F. and 180° F. The composition for the oil well cement retarder of the present invention is as follows:

| | Per cent |
|---|---|
| Boric acid | 52.5 |
| Borax | 26.2 |
| Gum arabic | 5.2 |
| Calcium tartrate | 12.6 |
| Tartaric acid | 3.5 |

The percentage of calcium tartrate is the correct amount to give equal or approximately the same stiffening times at all temperatures within the range 140° F. and 180° F. In the absence of calcium tartrate the stiffening times of the cement are from two to three hours shorter at 140° F. than at 180° F. The use of tartaric acid in the cement in addition also gives greater fluidity to the cement and provides sufficient acidity to counteract any alkalinity introduced by using alkaline water in mixing cement with its accompanying deleterious action on the cement.

As a specific embodiment of the present invention, different percentages of the retarder of the above composition produce the following stiffening time results:

| | Percent retarder added | | | |
|---|---|---|---|---|
| | 0.30 | 0.35 | 0.40 | 0.45 |
| | Hr. Min. | Hr. Min. | Hr. Min. | Hr. Min. |
| Tests at 140° F | 4 55 | 6 0 | 5 53 | 6 10 |
| Tests at 180° F | 4 20 | 5 40 | 5 50 | 6 40 |

These tests indicate that with different percentages of the retarder different setting times may be obtained but that with each percentage the setting time within the range 140°–180° F. will be substantially uniform.

In the absence of the calcium tartrate of the above composition the setting times of the cement within the range 140°–180° F. are non-uniform as may be noted from the following tests duplicating the above tests:

| | Percent retarder added | | | |
|---|---|---|---|---|
| | 0.30 | 0.35 | 0.40 | 0.45 |
| | Hr. Min. | Hr. Min. | Hr. Min. | Hr. Min. |
| Tests at 140° F | 4 20 | 4 10 | 3 50 | 3 30 |
| Tests at 180° F | 7 40 | 6 15 | 6 30 | 6 10 |

From the above description of the present invention, it is believed apparent that the retarder composition of the present invention and the cement composition containing the same is a marked improvement over prior art cements, and that the same may be widely adapted without essential departure therefrom, and all modifications of the same are contemplated as may fall within the scope of the following claims:

What I claim is:

1. A retarder composition for addition to cement, said composition containing boric acid, borax and gum arabic in percentages approximating 52.5%, 26.2% and 5.2%, respectively, and also containing about 12.6% calcium tartrate and about 3.5% tartaric acid, the calcium tartrate functioning to produce a substantially uniform time interval of setting within the temperature range 140-180° F. for the cement to which the composition is added and the tartaric acid functioning to neutralize any alkali present in the cement.

2. A cement composition characterized by a substantially uniform setting time within the range 140°-180° F., said composition comprising Portland cement modified to be sulfate resisting mixed with about 40% water to form a slurry and containing between .30% to .45% of the retarder composition defined by claim 1.

3. A cement composition characterized by a substantially uniform setting time within the range 140°-180° F., said composition comprising Portland cement modified to be sulfate resisting mixed with about 40% water to form a slurry and limiting same to .30% of the retarder composition defined by claim 1.

4. A cement composition characterized by a substantially uniform setting time within the range 140°-180° F., said composition comprising Portland cement modified to be sulfate resisting mixed with about 40% water to form a slurry and limiting same to .45% of the retarder composition of claim 1.

CHARLES H. DICKENS.